(12) United States Patent
Elsherbini et al.

(10) Patent No.: US 10,408,501 B2
(45) Date of Patent: Sep. 10, 2019

(54) ENVIRONMENTAL CONTROL SYSTEM WITH EJECTOR-ENHANCED COOLING

(71) Applicant: HAMILTON SUNDSTRAND CORPORATION, Windsor Locks, CT (US)

(72) Inventors: Abdelrahman I. Elsherbini, Windsor, CT (US); Brian St. Rock, Andover, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 270 days.

(21) Appl. No.: 15/386,161

(22) Filed: Dec. 21, 2016

(65) Prior Publication Data

US 2018/0170554 A1 Jun. 21, 2018

(51) Int. Cl.
*B64D 13/08* (2006.01)
*F25B 1/06* (2006.01)
(Continued)

(52) U.S. Cl.
CPC .............. *F25B 1/06* (2013.01); *B64D 13/06* (2013.01); *B64D 13/08* (2013.01);
(Continued)

(58) Field of Classification Search
CPC .................... B64D 13/08; B64D 13/06; B64D 2013/0618; F25B 9/08
See application file for complete search history.

(56) References Cited

U.S. PATENT DOCUMENTS 2,585,570 A * 2/1952 Messinger ............. B64D 13/06
454/74
4,263,786 A 4/1981 Eng
(Continued)

FOREIGN PATENT DOCUMENTS

| DE | 102012015535 | 2/2014 |
|---|---|---|
| EP | 2224130 | 9/2010 |
| WO | 9737890 | 10/1997 |

OTHER PUBLICATIONS

EP Application No. 17209085.4 Extended European Search Report dated Apr. 9, 2018, 9 pages.
(Continued)

*Primary Examiner* — Frantz F Jules
*Assistant Examiner* — Lionel Nouketcha
(74) *Attorney, Agent, or Firm* — Cantor Colburn LLP

(57) ABSTRACT

An environmental control system includes a primary heat exchanger operable to transfer heat from an air source to a refrigerant in a generator flow and output an air flow. An ejector is operable to produce an intermediate refrigerant flow based on receiving the generator flow as a motive fluid and drawing a vapor refrigerant flow as a suction fluid. A refrigerant condenser is operable to convert the intermediate refrigerant flow to a liquid refrigerant flow. A pump is operable to provide the refrigerant to the primary heat exchanger from a portion of the liquid refrigerant flow. An expansion device is operable to expand the liquid refrigerant flow prior to entering an evaporator. The evaporator is operable to convert the liquid refrigerant flow to the vapor refrigerant flow and produce a cooled evaporator air flow output based on the air flow.

16 Claims, 8 Drawing Sheets

(51) Int. Cl.
*B64D 13/06* (2006.01)
*F25B 9/08* (2006.01)
*F25B 5/02* (2006.01)

(52) U.S. Cl.
CPC .............. *B64D 2013/0618* (2013.01); *B64D 2013/0648* (2013.01); *B64D 2013/0662* (2013.01); *B64D 2013/0674* (2013.01); *B64D 2013/0688* (2013.01); *F25B 5/02* (2013.01); *F25B 9/08* (2013.01)

(56) References Cited

U.S. PATENT DOCUMENTS

| | | | | |
|---|---|---|---|---|
| 4,840,036 | A * | 6/1989 | Spraker, Jr. | B64D 13/06 62/172 |
| 5,287,694 | A * | 2/1994 | Davis | B64D 13/06 417/77 |
| 5,918,472 | A * | 7/1999 | Jonqueres | B64D 13/06 62/172 |
| 6,375,849 | B1 * | 4/2002 | Crabtree | B64D 13/08 210/195.2 |
| 6,928,827 | B2 | 8/2005 | Zaple et al. | |
| 8,915,095 | B2 | 12/2014 | Bruno et al. | |
| 9,372,014 | B2 * | 6/2016 | Nagano | F25B 41/00 |
| 2012/0234026 | A1 * | 9/2012 | Oh | F25B 9/008 62/115 |
| 2015/0184898 | A1 * | 7/2015 | Vaisman | F25B 5/02 62/115 |
| 2016/0131032 | A1 * | 5/2016 | Pomme | F02C 3/32 60/783 |
| 2016/0356677 | A1 * | 12/2016 | Bollas | G01M 99/005 |
| 2018/0187929 | A1 * | 7/2018 | Liu | F25B 13/00 |

OTHER PUBLICATIONS

O. Baagil, et al., "Ejector Refrigeration Cycle for Natural Gas Plant Waste Heat Recovery in Hot Climates," AICHE Spring National Meeting, Apr. 29, 2015, pp. 271-282.
EP Application No. 17209085.4 Office Action dated Apr. 16, 2019, 4 pages.

* cited by examiner

ENVIRONMENTAL CONTROL SYSTEM WITH EJECTOR-ENHANCED COOLING

BACKGROUND

This disclosure relates to environmental control systems, and more particularly to an environmental control system with ejector-enhanced cooling for an aircraft.

Environmental control systems (ECSs) are utilized on various types of aircraft for several purposes, such as in cooling systems for the aircraft. For example, components of an ECS may be utilized to remove heat from various aircraft lubrication and electrical systems and/or used to condition aircraft cabin air. A cabin air conditioner utilizes compressed air from an outside source such as engine bleed or a ram air system with one or more cabin air compressors (CACs). The compressed air is delivered to an environmental control system to bring it to a desired temperature and pressure and supply it to the aircraft cabin. After passing through the cabin, part of the air is typically exhausted to the outside and another part is recirculated.

Air cycle machines used in ECSs occupy large volumes and consume a high amount of energy (e.g., typically about 75% of all non-propulsive energy). There is a need to improve volume and energy efficiency of ECSs in aircraft applications.

BRIEF DESCRIPTION

In an embodiment, an environmental control system includes a primary heat exchanger operable to transfer heat from an air source to a refrigerant in a generator flow and output an air flow. An ejector is in fluid communication with the primary heat exchanger and operable to produce an intermediate refrigerant flow based on receiving the generator flow as a motive fluid and drawing a vapor refrigerant flow as a suction fluid. A refrigerant condenser is in fluid communication with the ejector and operable to convert the intermediate refrigerant flow to a liquid refrigerant flow. A pump is operable to provide the refrigerant to the primary heat exchanger from a portion of the liquid refrigerant flow. An expansion device is in fluid communication with the refrigerant condenser and an evaporator and operable to expand the liquid refrigerant flow prior to entering the evaporator. The evaporator is in fluid communication with the ejector and the refrigerant condenser and operable to convert the liquid refrigerant flow to the vapor refrigerant flow and produce a cooled evaporator air flow output based on the air flow.

In addition to one or more of the features described above, or as an alternative to any of the foregoing embodiments, further embodiments may include a secondary heat exchanger operable to cool the air flow prior to reaching the evaporator.

In addition to one or more of the features described above, or as an alternative to any of the foregoing embodiments, further embodiments may include where a ram air flow is divided between the refrigerant condenser and the secondary heat exchanger.

In addition to one or more of the features described above, or as an alternative to any of the foregoing embodiments, further embodiments may include a compressor operable to compress a portion of the ram air flow to produce the air source.

In addition to one or more of the features described above, or as an alternative to any of the foregoing embodiments, further embodiments may include where a ram air flow received at the refrigerant condenser is passed in series to the secondary heat exchanger.

In addition to one or more of the features described above, or as an alternative to any of the foregoing embodiments, further embodiments may include a pre-cooler operable to supply the air source to the primary heat exchanger as pre-cooled based on a ram air flow received at the refrigerant condenser and passed to the pre-cooler.

In addition to one or more of the features described above, or as an alternative to any of the foregoing embodiments, further embodiments may include a turbine operable to produce a cooled air output based on the cooled evaporator air flow output, where the turbine is further operable to drive one or more ram air fans and/or an air compressor, and a mixer is operable to combine the cooled air output with a recirculated air flow to produce a supply air flow for the aircraft.

In addition to one or more of the features described above, or as an alternative to any of the foregoing embodiments, further embodiments may include where a condensate is removed from the evaporator, condensate is used for evaporative precooling of ram air, and moisture is selectively added to the air flow as needed.

In addition to one or more of the features described above, or as an alternative to any of the foregoing embodiments, further embodiments may include a moisture condenser in fluid communication with the evaporator and the turbine and operable to remove a condensate from the cooled evaporator air flow output.

In addition to one or more of the features described above, or as an alternative to any of the foregoing embodiments, further embodiments may include a second ejector, a second pump, a second expansion device, and a second turbine, where a first refrigerant ejector cycle is formed between the primary heat exchanger, the ejector, a first section of the refrigerant condenser, the pump, the expansion device, and the evaporator, and a second refrigerant ejector cycle is formed between the primary heat exchanger, the second ejector, a second section of the refrigerant condenser, the second pump, the second expansion device, and the evaporator, and further where the turbine and the second turbine are configured to produce the cooled air output based on the cooled evaporator air flow output.

In an embodiment, a method of environmental control for an aircraft includes transferring heat in a primary heat exchanger from an air source to a refrigerant in a generator flow and outputting an air flow. An intermediate refrigerant flow is produced based on receiving the generator flow as a motive fluid and drawing a vapor refrigerant flow as a suction fluid by an ejector in fluid communication with the primary heat exchanger. The intermediate refrigerant flow is converted to a liquid refrigerant flow by a refrigerant condenser in fluid communication with the ejector. The refrigerant is provided to the primary heat exchanger at higher pressure from a portion of the liquid refrigerant flow by a pump. An expansion device in fluid communication with the refrigerant condenser and an evaporator expands the liquid refrigerant flow prior to entering the evaporator. The liquid refrigerant flow is converted to the vapor refrigerant flow by the evaporator in fluid communication with the ejector and the refrigerant condenser, and a cooled evaporator air flow output is produced based on the air flow.

A technical effect of the systems and methods is achieved by using ejector-enhanced cooling in an aircraft environmental control system as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Various embodiments of the present disclosure are related to environmental control systems (ECSs) for an aircraft. Embodiments can include one or more refrigerant ejector cycles that utilize waste heat recovery to augment cooling for an ECS and/or power electronics on an aircraft. A refrigerant ejector cycle can be combined with an air cycle using reduced components, power and volume as compared to contemporary systems, such as air cycle machines or vapor compression (VC) assisted cycles. Compared to air cycles, embodiments save a compression and expansion stage. Compared to VC assisted cycles, embodiments of the ejector system save a refrigerant compressor and its power requirement. In addition, significant reductions in component volumes can be achieved. Embodiments utilize rejected waste heat to generate extra cooling. The use of two-phase refrigerant heat exchangers saves volume over air-to-air heat exchangers. Reduction of components can also improve reliability and cost.

Figure 1:
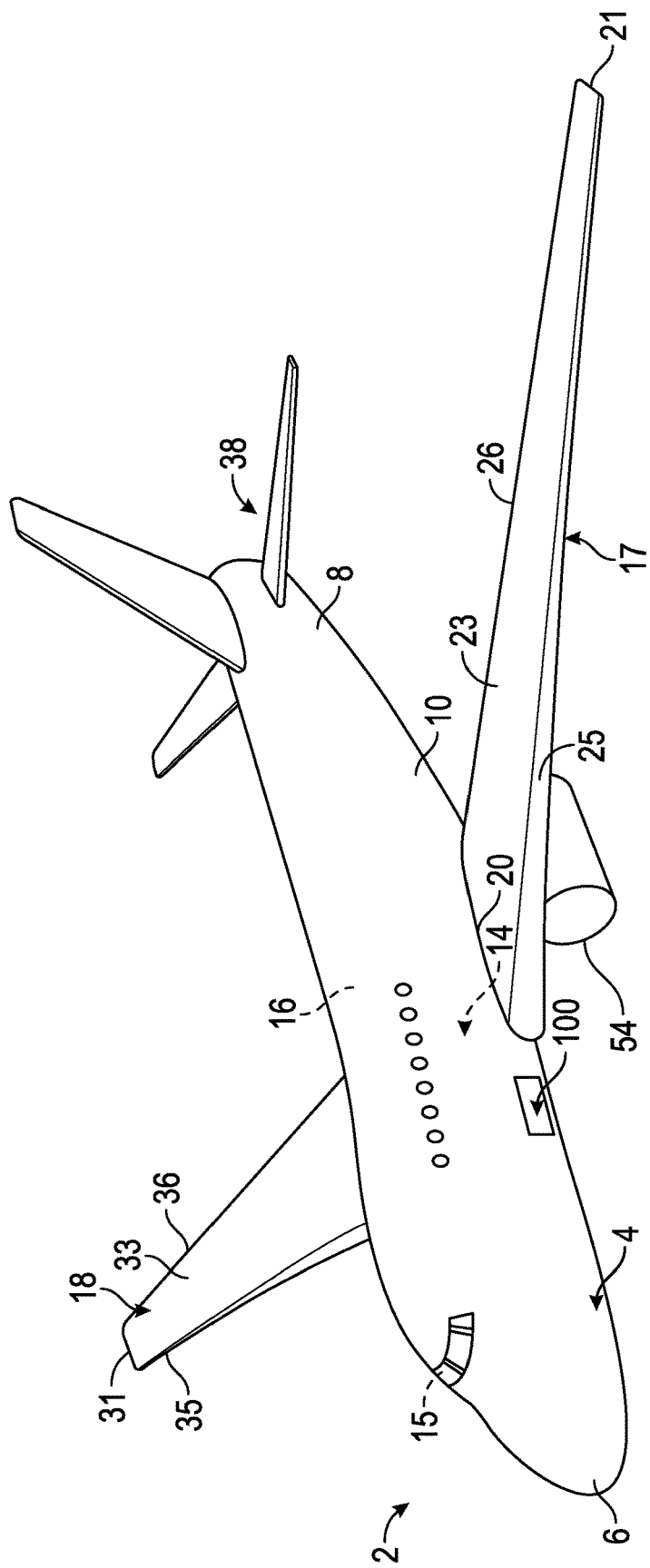
FIG. 1 is a perspective view of an aircraft that may incorporate embodiments of the present disclosure.

Referring now to FIG. 1, which shows a perspective view of an aircraft 2 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. Aircraft 2 includes an engine 54 configured to provide propulsion to the aircraft 2. One or more environmental control systems 100 are configured to supply the aircraft cabin 14 and/or other portions of the aircraft 2 with conditioned air.

Figure 2:
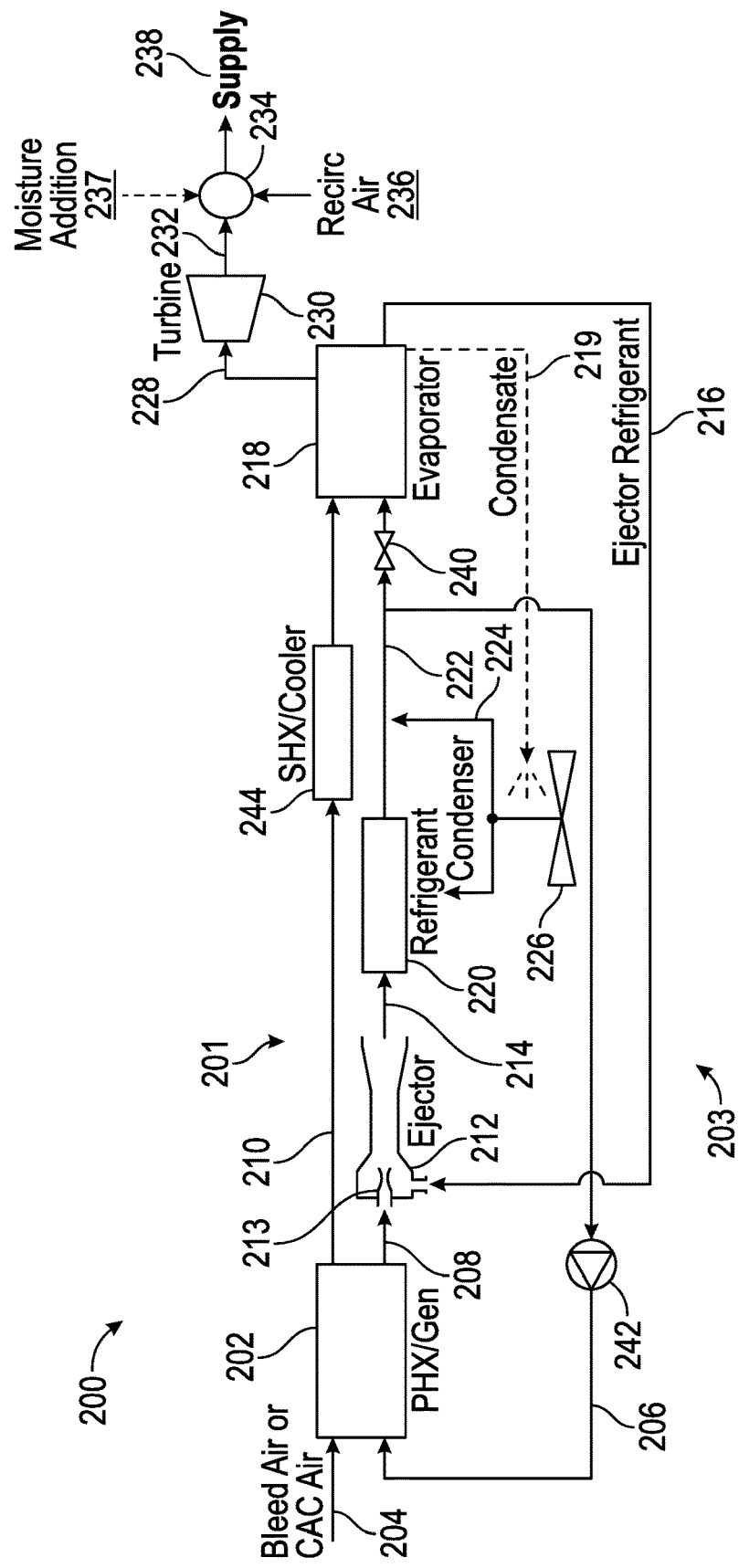
FIG. 2 is a schematic illustration of an environmental control system in accordance with an embodiment of the disclosure.

FIG. 2 depicts an environmental control system 200 as an embodiment of the environmental control system 100 of FIG. 1. In the example of FIG. 2, the environmental control system 200 includes a primary heat exchanger 202 operable to transfer heat from an air source 204 to a refrigerant 206 in a generator flow 208 and output an air flow 210. The refrigerant 206 can be any type of a tertiary fluid as selected based on desired performance and suitability for an aerospace environment. The air source 204 can be extracted from various sources, such as bleed air from engine 54 of FIG. 1, cabin air compressor (CAC) air, or other locations having an elevated temperature and pressure. An ejector 212 is in fluid communication with the primary heat exchanger 202 and is operable to produce an intermediate refrigerant flow 214 based on receiving the generator flow 208 as a motive fluid and draws a refrigerant vapor flow 216 as a suction fluid. A nozzle 213 within the ejector 212 accelerates the generator flow 208, which in turn draws the refrigerant vapor flow 216 from an evaporator 218 to produce the intermediate refrigerant flow 214.

A refrigerant condenser 220 is in fluid communication with the ejector 212 and is operable to convert the intermediate refrigerant flow 214 to a liquid refrigerant flow 222. The refrigerant condenser 220 may be cooled by a ram air flow 224 received from a ram air source 226, e.g., ambient air flow drawn from outside of the aircraft 2 of FIG. 1. A pump 242 is operable to provide the refrigerant 206 to the primary heat exchanger 202 from a portion of the liquid refrigerant flow 222, at higher pressure.

The evaporator 218 is in fluid communication with the ejector 212 and the refrigerant condenser 220. The evaporator 218 is operable to convert the liquid refrigerant flow 222 to the refrigerant vapor flow 216 and produce a cooled evaporator air flow output 228 based on the entering air flow 210. An expansion device 240 may be in fluid communication with the refrigerant condenser 220 and the evaporator 218, where the expansion device 240 is operable to expand the liquid refrigerant flow 222 prior to entering the evaporator 218. A condensate 219 can be removed from the evaporator 218 and may be returned to the ram air flow 224 to precool it by evaporative cooling, or otherwise discharged or stored for later use in moisture addition to the air flow. The environmental control system 200 can also include a secondary heat exchanger 244 operable to cool the air flow 210 prior to reaching the evaporator 218. The ram air flow 224 can be divided between the refrigerant condenser 220 and the secondary heat exchanger 244.

A turbine 230 is operable to produce a cooled air output 232 based on the cooled evaporator air flow output 228. The turbine 230 may not be needed in embodiments where adequate cooling and pressure is achieved without it. A mixer 234 is operable to combine the cooled air output 232 with a recirculated air flow 236 to produce a supply air flow 238 for the aircraft 2 of FIG. 1. For example, the supply air flow 238 can be conditioned air for the aircraft cabin 14, power electronics cooling, or other application. In some embodiments, moisture 237 is selectively added to the air flow 238, for instance, at mixer 234 to increase humidity. All or a portion of the moisture 237 can be from condensate 219 and/or other sources. Moisture can be removed on the ground, while moisture may be added at cruise, for example.

Collectively, an air cycle 201 is formed between the air source 204 and the supply air flow 238 that is cooled by a refrigerant ejector cycle 203 which transitions between liquid and vapor phases without a vapor compressor. As depicted in the example of FIG. 2, the air cycle 201 includes the primary heat exchanger 202, secondary heat exchanger 244, evaporator 218, turbine 230, and mixer 234. The refrigerant ejector cycle 203 includes the primary heat exchanger 202, the ejector 212, the refrigerant condenser 220, the expansion device 240, the evaporator 218, and the pump 242. It will be understood that various elements can be added, removed, and/or combined in alternate embodiments, for example, as illustrated in further examples of FIGS. 3-7.

Figure 3:
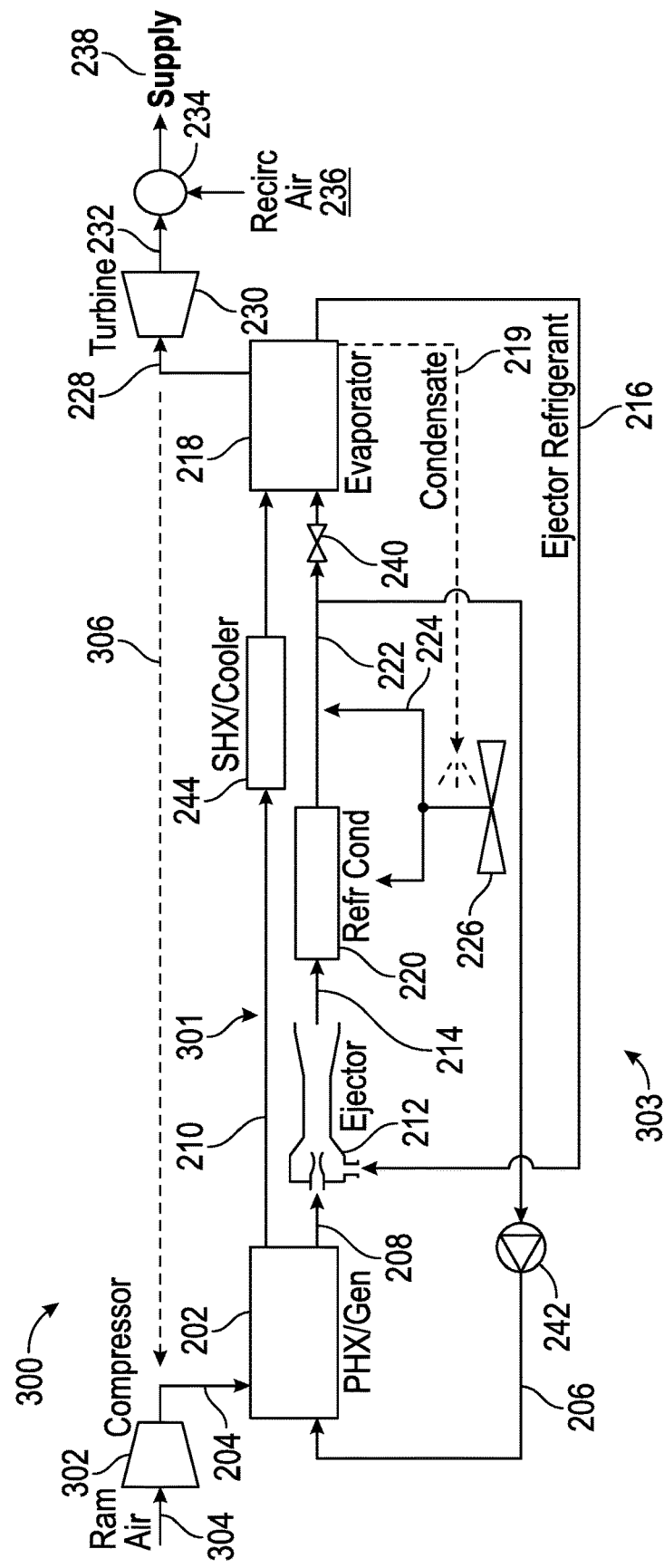
FIG. 3 is another schematic illustration of an environmental control system in accordance with an embodiment of the disclosure.

In the example of FIG. 3, an environmental control system 300 is depicted as another embodiment of the environmental control system 100 of FIG. 1 including many similar elements as previously described with respect to FIG. 2. The environmental control system 300 includes an air cycle 301 and a refrigerant ejector cycle 303. The air cycle 301 includes the primary heat exchanger 202, secondary heat exchanger 244, evaporator 218, turbine 230, and mixer 234. The refrigerant ejector cycle 303 includes the primary heat exchanger 202, the ejector 212, the refrigerant condenser 220, the expansion device 240, the evaporator 218, and the pump 242. Rather than drawing the heated air source 204 from engine bleed air, the embodiment of FIG. 3 includes an air compressor 302 that can compress ram air 304, for instance, from the ram air source 226 (e.g., one or more ram air fans) to produce the heated air source 204. In some embodiments, the air compressor 302 and/or the ram air source 226 are driven by the turbine 230, for instance, via a transmission 306. The transmission 306 can include a drive shaft, gearing, and/or other known elements, such as a clutch (not depicted).

Figure 4:
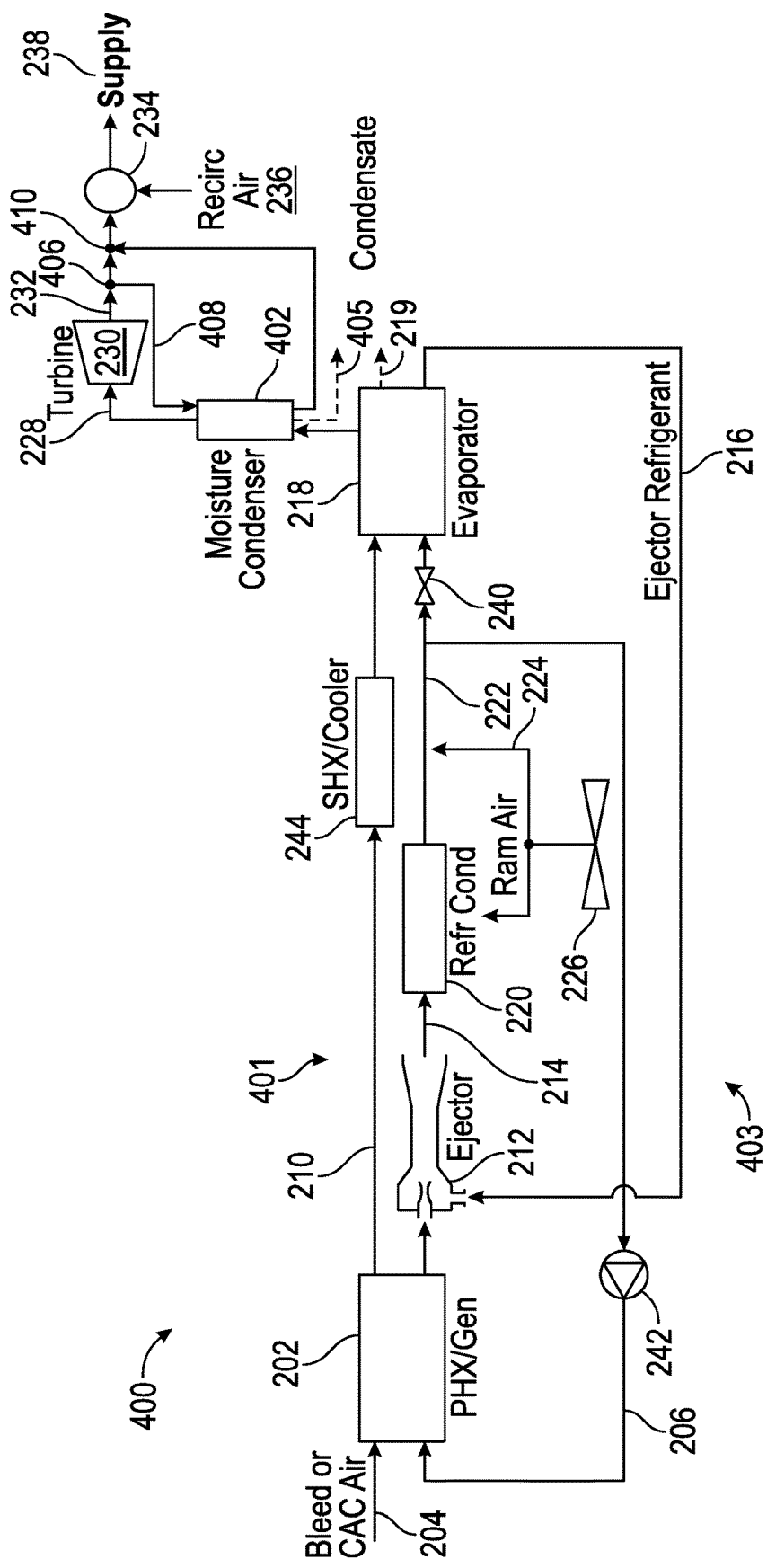
FIG. 4 is a further schematic illustration of an environmental control system in accordance with an embodiment of the disclosure.

In the example of FIG. 4, an environmental control system 400 is depicted as another embodiment of the environmental control system 100 of FIG. 1 including many similar elements as previously described with respect to FIG. 2. The environmental control system 400 includes an air cycle 401 and a refrigerant ejector cycle 403. The air cycle 401 includes the primary heat exchanger 202, secondary heat exchanger 244, evaporator 218, turbine 230, and mixer 234. The refrigerant ejector cycle 403 includes the primary heat exchanger 202, the ejector 212, the refrigerant condenser 220, the expansion device 240, the evaporator 218, and the pump 242.

In the example of FIG. 4, the air cycle 401 also includes a moisture condenser 402 in fluid communication with the evaporator 218 and the turbine 230. The moisture condenser 402 is operable to remove a condensate 405 from the cooled evaporator air flow output 228 using a portion of the cooled air output 232. For example, cooled evaporator air flow output 228 may pass through the moisture condenser 402 prior to reaching the turbine 230, and a valve 406 can route all or a portion of the cooled air output 232 through a flow path 408, through the moisture condenser 402, and a valve 410 back to the mixer 234 to dehumidify the cooled evaporator air flow output 228. The moisture condenser 402 can be used in embodiments where the removal of condensate 219 by the evaporator 218 provides insufficient dehumidification to meet a desired reduction in moisture content level at the supply air flow 238.

Figure 5:
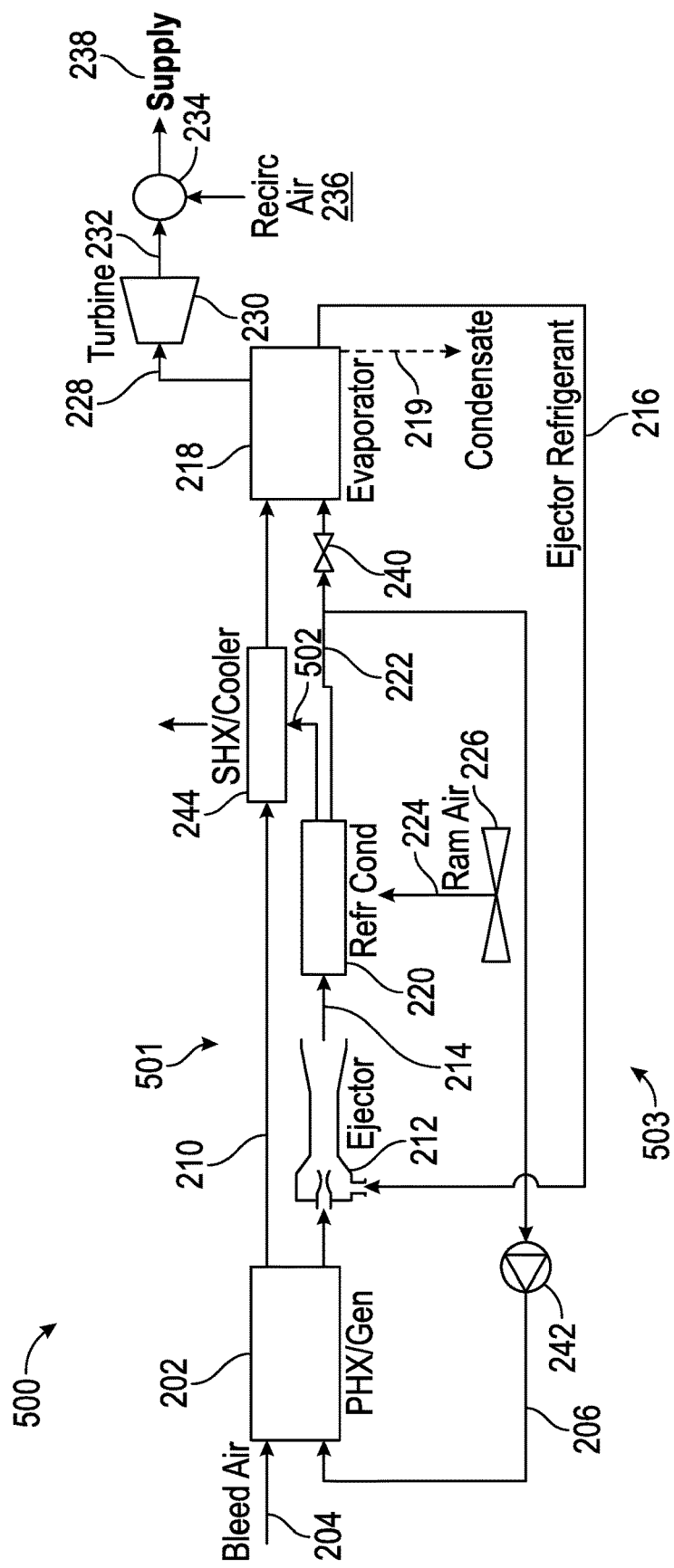
FIG. 5 is another schematic illustration of an environmental control system in accordance with an embodiment of the disclosure.

In the example of FIG. 5, an environmental control system 500 is depicted as another embodiment of the environmental control system 100 of FIG. 1 including many similar elements as previously described with respect to FIG. 2. The environmental control system 500 includes an air cycle 501 and a refrigerant ejector cycle 503. The air cycle 501 includes the primary heat exchanger 202, secondary heat exchanger 244, evaporator 218, turbine 230, and mixer 234. The refrigerant ejector cycle 503 includes the primary heat exchanger 202, the ejector 212, the refrigerant condenser 220, the expansion device 240, the evaporator 218, and the pump 242. Rather than dividing the ram air flow 224 from the ram air source 226 between the refrigerant condenser 220 and the secondary heat exchanger 244, the ram air flow 224 received at the refrigerant condenser 220 is passed in series 502 to the secondary heat exchanger 244. The series 502 cooling configuration of FIG. 5 may reduce the cooling capacity of the secondary heat exchanger 244 but may also simplify ducting and reduce overall system volume.

Figure 6:
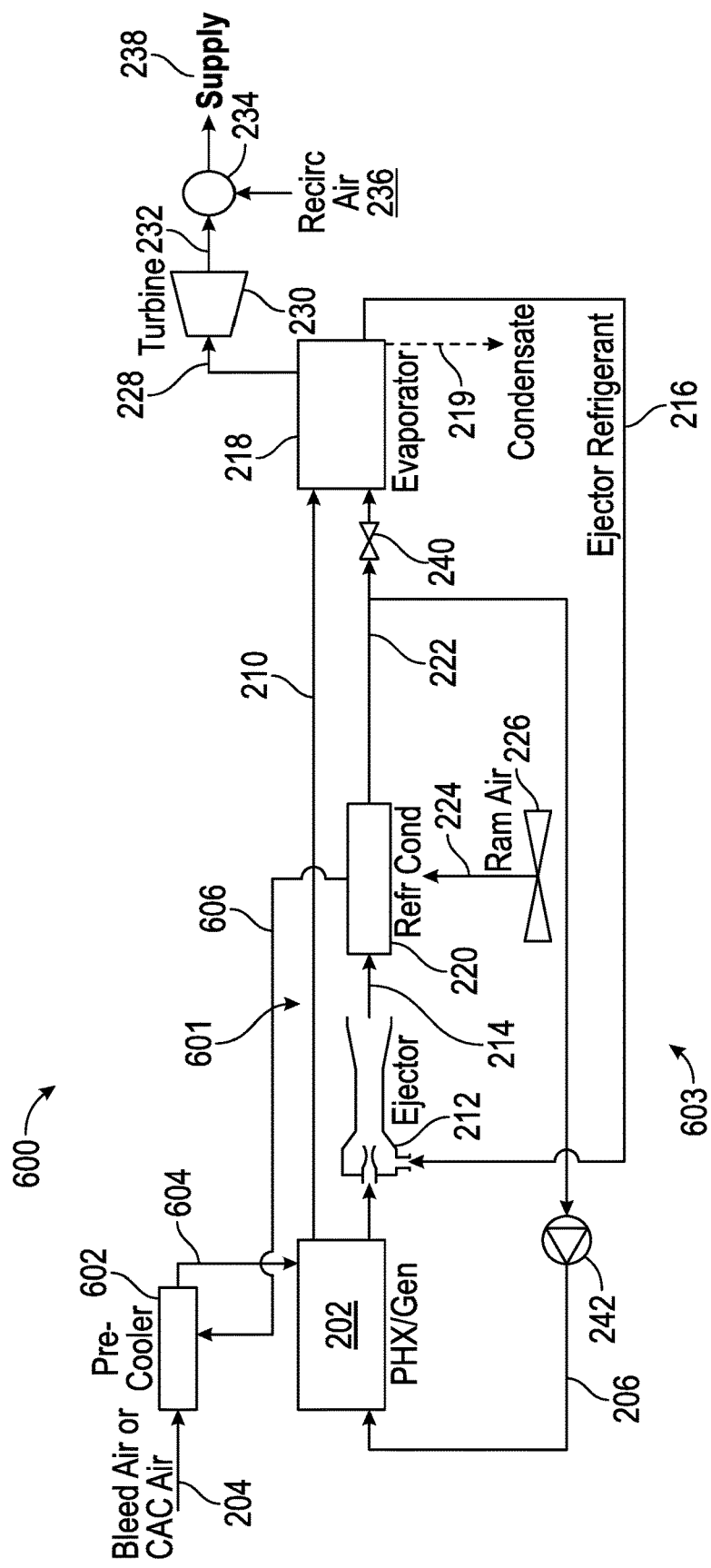
FIG. 6 is an additional schematic illustration of an environmental control system in accordance with an embodiment of the disclosure.

In the example of FIG. 6, an environmental control system 600 is depicted as another embodiment of the environmental control system 100 of FIG. 1 including many similar elements as previously described with respect to FIG. 2. The environmental control system 600 includes an air cycle 601 and a refrigerant ejector cycle 603. The air cycle 601 includes a pre-cooler 602, the primary heat exchanger 202, evaporator 218, turbine 230, and mixer 234. The refrigerant ejector cycle 603 includes the primary heat exchanger 202, the ejector 212, the refrigerant condenser 220, the expansion device 240, the evaporator 218, and the pump 242. The air cycle 601 removes the secondary heat exchanger 244 of FIGS. 2-5 and adds the pre-cooler 602 upstream from the primary heat exchanger 202. The pre-cooler 602 is operable to supply the heated air source 204 to the primary heat exchanger 202 as a pre-cooled flow 604 based on a ram air flow 224 received at the refrigerant condenser 220 that is passed in series 606 to the pre-cooler 602. In an alternative embodiment (not shown), the ram air flow can pass through the refrigerant condenser and pre-cooler in parallel. The pre-cooler 602 can be used in embodiments where cooling of the air source 204 is desired prior to the air source 204 reaching the primary heat exchanger 202.

Figure 7:
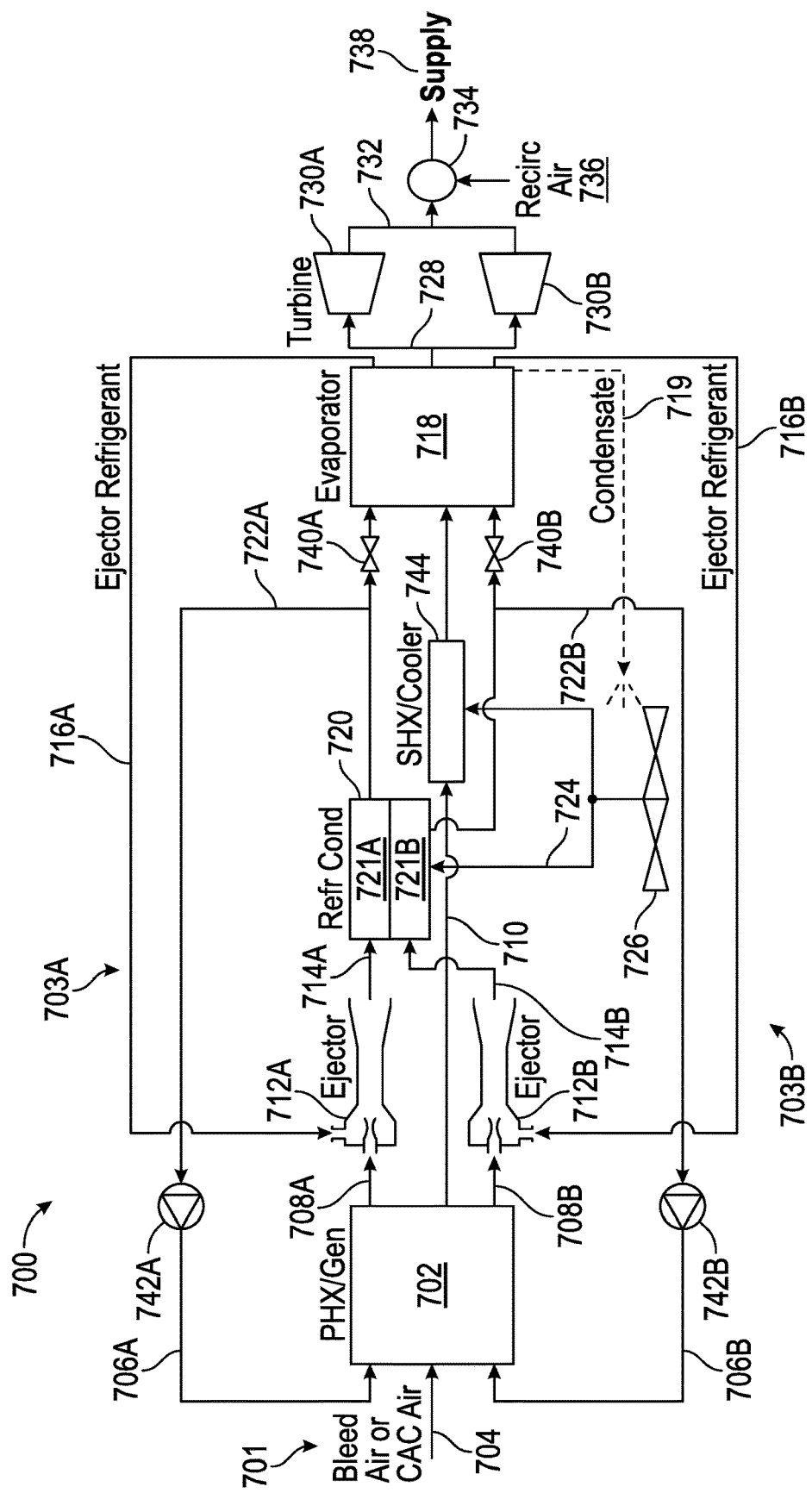
FIG. 7 is a further schematic illustration of an environmental control system in accordance with an embodiment of the disclosure.

In the example of FIG. 7, an environmental control system 700 is depicted as another embodiment of the environmental control system 100 of FIG. 1. The environmental control system 700 is an example of a pack-and-a-half configuration that includes redundant elements to enhance reliability over a single pack, but save volume over a 2-pack system. The environmental control system 700 includes an air cycle 701, a first refrigerant ejector cycle 703A, and a second refrigerant ejector cycle 703B. The air cycle 701 includes a primary heat exchanger 702, a secondary heat exchanger 744, an evaporator 718, a first turbine 730A, a second turbine 730B, and a mixer 734. The first refrigerant ejector cycle 703A is formed between the primary heat exchanger 702, a first ejector 712A, a first section 721A of a refrigerant condenser 720, a first pump 742A, a first expansion device 740A, and the evaporator 718. The second refrigerant ejector cycle 703B is formed between the primary heat exchanger 702, a second ejector 712B, a second section 721B of the refrigerant condenser 720, a second pump 742B, a second expansion device 740B, and the evaporator 718.

The primary heat exchanger 702 is operable to transfer heat from a heated air source 704 to a first refrigerant 706A in a first generator flow 708A and output an air flow 710. The air flow 710 can also or alternatively be cooled by transferring heat from the heated air source 704 to a second refrigerant 706B in a second generator flow 708B. The first refrigerant 706A and the second refrigerant 706B can both be the same type of refrigerant. The heated air source 704 can be extracted from various sources, such as bleed air from engine 54 of FIG. 1, CAC air, or other locations having an elevated temperature and pressure. The first ejector 712A is in fluid communication with the primary heat exchanger 702 and is operable to produce a first intermediate refrigerant flow 714A based on receiving the first generator flow 708A as a motive fluid and draws a first vapor refrigerant flow 716A as a suction fluid. Similarly, the second ejector 712B is in fluid communication with the primary heat exchanger 702 and is operable to produce a second intermediate refrigerant flow 714B based on receiving the second generator flow 708B as a motive fluid and draws a second vapor refrigerant flow 716B as a suction fluid.

The first section 721A of the refrigerant condenser 720 is in fluid communication with the first ejector 712A and is operable to convert the first intermediate refrigerant flow 714A to a first liquid refrigerant flow 722A. The second section 721B of the refrigerant condenser 720 is in fluid communication with the second ejector 712B and is operable to convert the second intermediate refrigerant flow 714B to a second liquid refrigerant flow 722B. The refrigerant condenser 720 may be cooled by a ram air flow 724 received from a ram air source 726, e.g., ambient air flow drawn from outside of the aircraft 2 of FIG. 1. The first pump 742A is operable to provide the first refrigerant 706A to the primary heat exchanger 702 from a portion of the first liquid refrigerant flow 722A. The second pump 742B is operable to provide the second refrigerant 706B to the primary heat exchanger 702 from a portion of the second liquid refrigerant flow 722B.

The evaporator 718 is in fluid communication with the first ejector 712A and the first section 721A of the refrigerant condenser 720 (e.g., through the first expansion device 740A). The evaporator 718 is also in fluid communication with the second ejector 712B and the second section 721B of the refrigerant condenser 720 (e.g., through the second expansion device 740B). The evaporator 718 is operable to convert the first liquid refrigerant flow 722A to the first vapor refrigerant flow 716A, convert the second liquid refrigerant flow 722B to the second vapor refrigerant flow 716B, and produce a cooled evaporator air flow output 728 based on the entering air flow 710. A condensate 719 can be removed from the evaporator 718 and may be returned to the ram air flow 724 to precool it by evaporative cooling, or otherwise discharged or stored. The ram air flow 724 can be divided between the refrigerant condenser 720 and the secondary heat exchanger 744.

The first turbine 730A and the second turbine 730B can be configured in parallel to produce cooled air output 732 based on the cooled evaporator air flow output 728 from the evaporator 718. The mixer 734 is operable to combine the cooled air output 732 with a recirculated air flow 736 to produce a supply air flow 738 for the aircraft 2 of FIG. 1. It will be understood that other arrangements are contemplated in various embodiments, including shifting of component locations, series or parallel variations, further combining or subdividing of various functionality, and the like.

Figure 8:
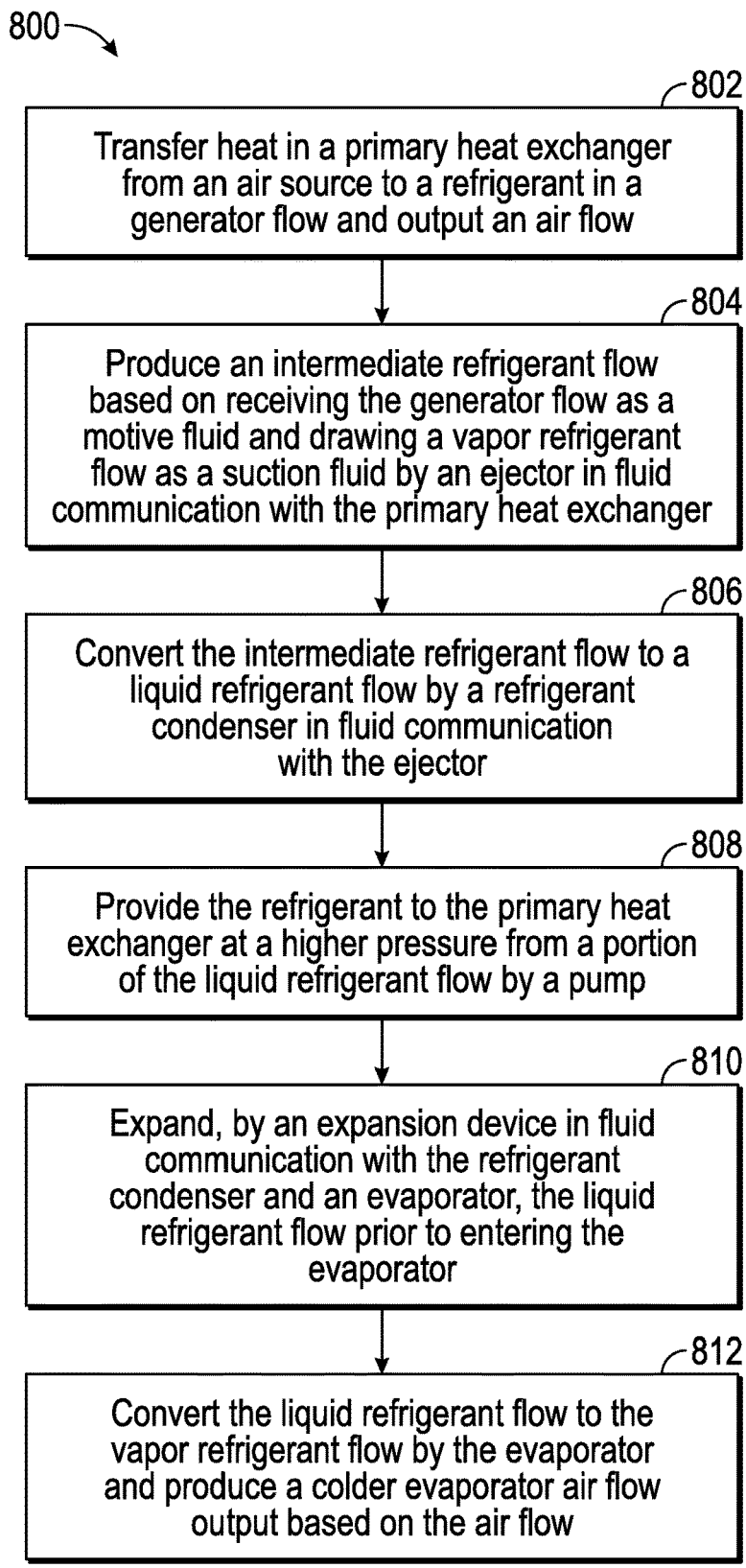
FIG. 8 is a process flow of a method in accordance with an embodiment of the disclosure.

FIG. 8 is a process flow illustrating a method 800 for providing an environmental control system for an aircraft in accordance with an embodiment. The method 800 of FIG. 8 is described in reference to FIGS. 1-7 and may be performed with an alternate order and include additional steps. At block 802, heat is transferred in a primary heat exchanger 202 from an air source 204 to a refrigerant 206 in a generator flow 208, and an air flow 210 is output. At block 804, an intermediate refrigerant flow 214 is produced based on receiving the generator flow 208 as a motive fluid and drawing a vapor refrigerant flow 216 as a suction fluid by an ejector 212 in fluid communication with the primary heat exchanger 202. At block 806, the intermediate refrigerant flow 214 is converted to a liquid refrigerant flow 222 by a refrigerant condenser 220 in fluid communication with the ejector 212.

At block 808, the refrigerant 206 is provided to the primary heat exchanger 202 at higher pressure from a portion of the liquid refrigerant flow 222 by a pump 242. At block 810, an expansion device 240 in fluid communication with the refrigerant condenser 220 and an evaporator 218 expands the liquid refrigerant flow 222 prior to entering the evaporator 218. At block 812, the liquid refrigerant flow 222 is converted to the vapor refrigerant flow 216 by the evaporator 218 in fluid communication with the ejector 212 and the refrigerant condenser 220. The evaporator 218 also produces a cooled evaporator air flow output 228 based on the air flow 210. A condensate 219 can be removed from the evaporator 218. A secondary heat exchanger 244 can cool the air flow 210 prior to reaching the evaporator 218. A ram air flow 224 can be divided between the refrigerant condenser 220 and the secondary heat exchanger 244. Alternatively, a ram air flow 224 received at the refrigerant condenser 220 can be passed in series to the secondary heat exchanger 244. In some embodiments, a portion of ram air flow 304 is compressed to produce the air source 204.

A turbine 230 can produce a cooled air output 232 based on the cooled evaporator air flow output 228. The cooled air output 232 can be combined with a recirculated air flow 236 at a mixer 234 to produce a supply air flow 238 for the aircraft 2. Moisture 237 can be selectively added to the air flow 238 as needed, for instance, due to a low humidity condition. In some embodiments, a condensate 405 can be removed from the cooled evaporator air flow output 228 by a moisture condenser 402 in fluid communication with the evaporator 218 and the turbine 230.

In some embodiments, the heated air source 204 is supplied from a pre-cooler 602 to the primary heat exchanger 202 as pre-cooled based on a ram air flow 224 received at the refrigerant condenser 220 passed in series to the pre-cooler 602. Embodiments can include multiple refrigerant ejector cycles, where a first refrigerant ejector cycle 703A is formed between the primary heat exchanger 702, a first ejector 712A, a first section 721A of the refrigerant condenser 720, and the evaporator 718, and a second refrigerant ejector cycle 703B is formed between the primary heat exchanger 702, a second ejector 712B, a second section 721B of the refrigerant condenser 720, and the evaporator 718. A first turbine 730A and a second turbine 730B can be configured in parallel to produce cooled air output 732 based on cooled evaporator air flow output 728.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An environmental control system for an aircraft, the environmental control system comprising:

a primary heat exchanger operable to transfer heat from an air source to a refrigerant in a generator flow and output an air flow;
an ejector in fluid communication with the primary heat exchanger and operable to produce an intermediate refrigerant flow based on receiving the generator flow as a motive fluid and drawing a vapor refrigerant flow as a suction fluid;
a refrigerant condenser in fluid communication with the ejector and operable to convert the intermediate refrigerant flow to a liquid refrigerant flow;
a pump operable to provide the refrigerant to the primary heat exchanger from a portion of the liquid refrigerant flow;
an expansion valve in fluid communication with the refrigerant condenser and an evaporator and operable to expand the liquid refrigerant flow prior to entering the evaporator; the evaporator in fluid communication with the ejector and the refrigerant condenser and operable to convert the liquid refrigerant flow to the vapor refrigerant flow and produce a cooled evaporator air flow output based on the air flow;
a turbine operable to produce a cooled air output based on the cooled evaporator air flow output, wherein the turbine is further operable to drive one or more ram air fans and/or an air compressor;
a second ejector, a second pump, a second expansion valve, and a second turbine, wherein a first refrigerant ejector cycle is formed between the primary heat exchanger, the ejector, a first section of the refrigerant condenser, the pump, the expansion valve, and the evaporator, and a second refrigerant ejector cycle is formed between the primary heat exchanger, the second ejector, a second section of the refrigerant condenser, the second pump, the second expansion valve, and the evaporator, and further wherein the turbine and the second turbine are configured to produce the cooled air output based on the cooled evaporator air flow output; and
a mixer operable to combine the cooled air output with a recirculated air flow to produce a supply air flow for the aircraft.

2. The environmental control system as in claim 1, further comprising a secondary heat exchanger operable to cool the air flow prior to reaching the evaporator.

3. The environmental control system as in claim 2, wherein a ram air flow is divided between the refrigerant condenser and the secondary heat exchanger.

4. The environmental control system as in claim 3, further comprising a compressor operable to compress a portion of the ram air flow to produce the air source.

5. The environmental control system as in claim 2, wherein a ram air flow received at the refrigerant condenser is passed in series to the secondary heat exchanger.

6. The environmental control system as in claim 1, further comprising a pre-cooler operable to supply the air source to the primary heat exchanger as pre-cooled based on a ram air flow received at the refrigerant condenser and passed to the pre-cooler.

7. The environmental control system as in claim 1, wherein a condensate is removed from the evaporator and moisture is selectively added to the air flow.

8. The environmental control system as in claim 1, further comprising a moisture condenser in fluid communication with the evaporator and the turbine and operable to remove a condensate from the cooled evaporator air flow output.

9. A method of environmental control for an aircraft, the method comprising:
transferring heat in a primary heat exchanger from an air source to a refrigerant in a generator flow and outputting an air flow;
producing an intermediate refrigerant flow based on receiving the generator flow as a motive fluid and drawing a vapor refrigerant flow as a suction fluid by an ejector in fluid communication with the primary heat exchanger;
converting the intermediate refrigerant flow to a liquid refrigerant flow by a refrigerant condenser in fluid communication with the ejector;
providing the refrigerant to the primary heat exchanger at higher pressure from a portion of the liquid refrigerant flow by a pump;
expanding, by an expansion valve in fluid communication with the refrigerant condenser and an evaporator, the liquid refrigerant flow prior to entering the evaporator;
converting the liquid refrigerant flow to the vapor refrigerant flow by the evaporator in fluid communication with the ejector and the refrigerant condenser, and producing a cooled evaporator air flow output based on the air flow;
producing, by a turbine, a cooled air output based on the cooled evaporator air flow output, wherein a first refrigerant ejector cycle is formed between the primary heat exchanger, the ejector, a first section of the refrigerant condenser, the pump, the expansion valve, and the evaporator, and a second refrigerant ejector cycle is formed between the primary heat exchanger, a second ejector, a second section of the refrigerant condenser, a second pump, a second expansion valve, and the evaporator, and further wherein the turbine and a second turbine are configured to produce the cooled air output based on the cooled evaporator air flow output; and
combining the cooled air output with a recirculated air flow at a mixer to produce a supply air flow for the aircraft.

10. The method as in claim 9, further comprising:
cooling, by a secondary heat exchanger, the air flow prior to reaching the evaporator.

11. The method as in claim 10, further comprising:
dividing a ram air flow between the refrigerant condenser and the secondary heat exchanger.

12. The method as in claim 11, further comprising:
compressing a portion of the ram air flow to produce the air source.

13. The method as in claim 10, further comprising:
passing a ram air flow received at the refrigerant condenser in series to the secondary heat exchanger.

14. The method as in claim 9, further comprising:
supplying the air source from a pre-cooler to the primary heat exchanger as pre-cooled based on a ram air flow received at the refrigerant condenser passed to the pre-cooler.

15. The method as in claim 9, further comprising:
removing a condensate from the evaporator;
using condensate for evaporative precooling of ram air; and
selectively adding moisture to the air flow as needed.

16. The method as in claim 9, further comprising:
removing a condensate from the cooled evaporator air flow output by a moisture condenser in fluid communication with the evaporator and the turbine.

* * * * *